United States Patent [19]

Apostolos et al.

[11] Patent Number: 4,733,237
[45] Date of Patent: Mar. 22, 1988

[54] FM/CHIRP DETECTOR/ANALYZER AND METHOD

[75] Inventors: John T. Apostolos, Merrimack; Chester E. Stromswold, Nashua, both of N.H.

[73] Assignee: Sanders Associates, Inc., Nashua, N.H.

[21] Appl. No.: 689,524

[22] Filed: Jan. 7, 1985

[51] Int. Cl.$^4$ .................................................. G01S 7/36
[52] U.S. Cl. ...................................... 342/13; 455/226; 342/201
[58] Field of Search ............... 343/17.2 PC; 342/192, 342/132, 44, 195, 196, 197, 13, 201; 455/226, 145, 146, 147; 375/1

[56] References Cited

U.S. PATENT DOCUMENTS

| | | | |
|---|---|---|---|
| 2,151,747 | 3/1939 | Conrad | 370/11 |
| 3,283,080 | 11/1966 | Caputi, Jr. | |
| 3,354,456 | 11/1967 | Caputi | 343/17.2 PC |
| 3,363,248 | 1/1968 | Nicodemus | 343/17.2 PC |
| 3,484,693 | 12/1969 | Fong | 375/1 |
| 3,493,865 | 2/1970 | Miller | 375/1 |
| 3,654,554 | 4/1972 | Cook | 343/6.5 R X |
| 3,670,333 | 6/1972 | Winn | 343/18 E |
| 3,716,853 | 2/1973 | La Follette | |
| 3,764,999 | 10/1973 | Simons et al. | 343/18 E |
| 3,766,477 | 10/1973 | Cook | 343/17.2 PC |
| 3,886,551 | 5/1975 | Hempling | 343/18 E |
| 3,905,033 | 9/1975 | Moore et al. | 343/7.7 |
| 4,005,417 | 1/1977 | Collins | 343/17.2 PC |
| 4,021,805 | 5/1977 | Effinger et al. | 343/17.2 PC |
| 4,028,700 | 6/1977 | Carey et al. | 343/17.2 PC |
| 4,037,159 | 12/1981 | Mrtin | 343/17.2 PC |
| 4,166,980 | 9/1979 | Apostolos et al. | 325/363 |
| 4,204,165 | 5/1980 | Ready | 343/17.2 PC X |
| 4,305,159 | 12/1981 | Stromswold et al. | 455/226 |
| 4,333,080 | 6/1982 | Collins et al. | 343/17.2 PC X |
| 4,398,196 | 8/1983 | Wiegard | 342/13 X |
| 4,642,643 | 2/1987 | Wise et al. | 342/13 |
| 4,642,644 | 2/1987 | Wise et al. | 342/13 |

Primary Examiner—T. H. Tubbesing
Assistant Examiner—John B. Sotomayor
Attorney, Agent, or Firm—Richard I. Seligman; Stanton D. Weinstein

[57] ABSTRACT

A device for determining the frequency range and chirp rate of chirp radars or other sources of frequency-modulated signals includes a compressive receiver (16, 22, 24) for time-compressing single-frequency signals and a discriminator (26) for generating an output that represents the instantaneous frequency of the compressive-receiver output. For narrow-band signals, the frequency-modulated components in the output of the compressive receiver do not last long enough to cause a response from the discriminator (26). When the input of the compressive receiver is a chirp signal, on the other hand, the resultant compressive-receiver output lasts long enough to cause a discriminator response, and its time of occurrence and rate of frequency change are indications of the frequency range and chirp rate of the compressive-receiver input. The discriminator (26) accordingly generates an output whose slope is an indication of the chirp rate of the compressive-receiver input.

32 Claims, 2 Drawing Figures

FM/CHIRP DETECTOR/ANALYZER AND METHOD

BACKGROUND OF THE INVENTION

The present invention is directed to monitoring for the presence of frequency-modulated signals such as those produced by chirp radars.

In a chirp radar, a radar transmitter transmits a carrier whose frequency is swept through a range of frequencies and whose amplitude is modulated by pulses that typically are smooth and of relatively long duration. A common method of producing this type of signal is to generate a short-duration baseband pulse, band-limit it, typically with a Gaussian filter to provide a short-duration oscillatory signal, and apply the oscillatory signal to a dispersive delay line, which delays different frequencies by different amounts and thus spreads the signal in time. The spreading of the signal results in lower instantaneous power for a given average power. Despite the relatively long duration of the dispersed signal, however, a range resolution can be achieved that is approximately the same as that possible with the undispersed pulse. This is accomplished by using a reverse of the dispersive delay on reception to recompress the returned pulses.

In attempting to detect the presence of such radars and distinguish one from another, it is usually desirable to determine the chirp rate, or time rate of change of frequency, of the chirp radar as rapidly as possible. It has previously been proposed to analyze such signals by observing the frequency spectrum that results when they are applied to a compressive receiver, a device that responds to an input by generating an output whose time of occurrence depends on the frequency of the input. The output of a compressive receiver in response to a narrow-band signal is a short burst of the compressive-receiver center frequency, whereas the output in response to a chirp signal is a longer-duration burst. However, although the power spectrum of the output that results from a chirp signal can in some cases differ markedly from that resulting from a narrow-band signal, the difference is often minimal. Thus, it is often difficult by that method even to distinguish between chirp signals and narrow-band signals, and it is even more difficult to distinguish between chirp signals of different chirp rates. It is accordingly an object of the present invention to determine chirp rate automatically and in a reliable manner.

SUMMARY OF THE INVENTION

The foregoing and related objects are achieved in an apparatus that includes a compressive receiver and a frequency discriminator that receives the compressive-receiver output. The compressive receiver includes a frequency translator that receives input signals and repeatedly translates them in frequency at a constant sweep rate. The output of the frequency translator is applied to a linear dispersive delay line, which causes different delays for different frequencies. The frequency translator converts any single-frequency signal that it receives to an FM signal whose frequency is repeatedly swept at a rate that matches the delay-versus-frequency relationship of the dispersive delay line. That is, the frequency-translator outputs caused by later-arriving portions of the single-frequency signal within a given sweep are delayed by less than outputs from earlier-arriving portions, and the difference in delay is such that all frequency-translator outputs caused by frequency-translator inputs of a given frequency arrive at the delay-line output port simultaneously. Consequently, any single-frequency signal received by the frequency translator results in a compressed pulse in the output of the delay line, i.e., a pulse whose duration is a very small fraction of the delay-line output sweep time. The time within the sweep at which the output pulse occurs indicates the frequency of the signal that gives rise to it.

If the signal received by the frequency translator is a chirp signal, the output of the delay line is itself a chirp signal, and we have found that the chirp rate of this output chirp is related to the chirp rate of the input chirp signal that caused it. By feeding the output of the delay line to a frequency discriminator, which provides an output voltage that is proportional to the instantaneous frequency of the delay-line output, it is possible to determine the chirp rate of the received signal by observing the time rate of change of the discriminator output.

BRIEF DESCRIPTION OF THE DRAWINGS

These and further features and advantages of the present invention are described in connection with the accompanying drawings, in which.

DETAILED DESCRIPTION OF THE PREFERRED EMBODIMENT

Figure 1:
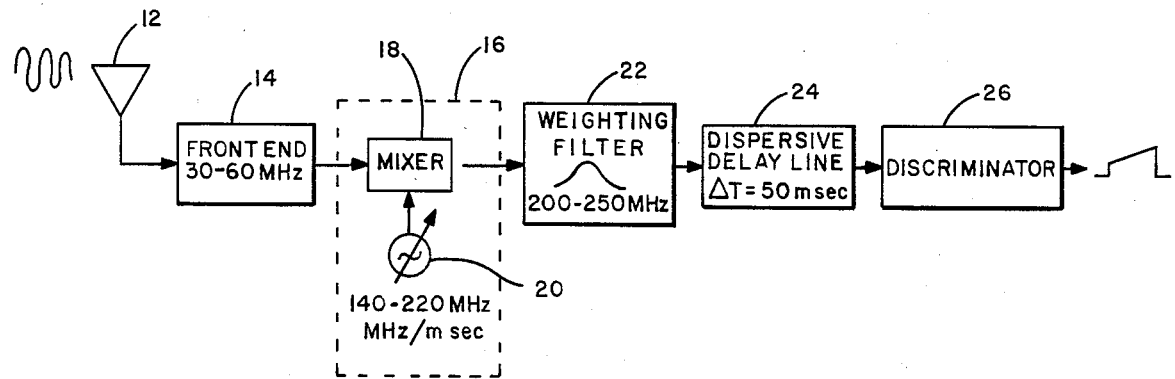
FIG. 1 is a block diagram of an embodiment of the present invention.

FIG. 1 illustrates a device for monitoring a range of frequencies and generating output ramp signals in response to chirp signals. The slope of a ramp is an indication of the chirp rate of the signal that gave rise to it, and the time of occurrence of the ramp is an indication of the frequency range of that signal. It is therefore possible to distinguish between chirp radars of different chirp rates by observing the slopes of the output ramp signals.

An antenna 12 feeds its signals to a receiver front end 14, which restricts the signals to a pass band of interest and amplifies them. The front-end output signals are fed to a frequency translator 16, which includes a mixer 18 that multiplies those signals by signals from a local oscillator 20. The local oscillator 20 is repeatedly swept in frequency; the frequency of its output begins at a relatively low value, increases linearly with time until it reaches an upper value, and then begins at the low value again. That is, a plot of local-oscillator frequency as a function of time would have a sawtooth shape. The mixer 18 transmits the resultant signal to a Gaussian weighting filter 22, whose output is applied to a dispersive delay line 24. The weighting filter 22 eliminates the lower sideband produced by the mixing operation, restricts the upper-sideband contributions to those within the effective bandwidth of the delay line, and weights the frequency components so that ringing, or sidelobes, are minimal in the delay-line outputs if the front-end outputs are narrow-band signals.

The delay encounted by a signal in the delay line 24 is a linear function of the frequency of the signal. The sweep rate of the frequency translator 16 is the negative of the ratio of frequency difference to the resultant difference in delay. This relationship of the delay-line characteristics to the frequency-translator sweep rate causes the delay-line output resulting from a single-frequency input to be compressed in time. Specifically, if the antenna 12 receives a CW signal (i.e., a single-frequency, single-amplitude signal) that lasts throughout a sweep of the local oscillator 20, the upper sideband of the resultant frequency-translator output is a frequency-modulated signal that lasts throughout the sweep period and has an instantaneous frequency (i.e., rate of phase advance) that increases linearly with time throughout the sweep. The weighting-filter output, on the other hand, lasts through only part of the sweep period, and its amplitude envelope is Gaussian. The time within the local-oscillator sweep at which that weighting-filter output component occurs depends on the frequency of the CW signal that gave rise to it.

The higher-frequency components that a CW front-end signal causes in the delay-line input are launched later than lower-frequency components are. Because higher-frequency signals propagate more quickly through the dispersive delay line 24 than lower-frequency signals do, though, the higher-frequency components tend to catch up with the earlier-arriving lower-frequency components. More specifically, because the delay-to-frequency relationship in the delay line 24 is the negative of the local-oscillator sweep rate, the later-launched higher-frequency signals arrive at substantially the same time as that at which the earlier-launched lower-frequency signals do. Therefore, all components resulting from a CW front-end signal during the same local-oscillator sweep occur in the delay-line output at substantially the same time.

CW signals of different frequencies undergo the same frequency translations and filtering; that is, their resultant delay-line inputs are all frequency-modulated signals of the same frequency range and envelope shape. However, although such delay-line inputs often overlap in time, they begin at different times, so the compressed delay-line output pulses that they cause occur at different times within the delay-line output sweep. Accordingly, the time at which a delay-line output pulse occurs is an indication of the frequency of the input signal that gave rise to it.

The foregoing description is based on the assumption of a CW signal at the antenna 12, but it applies to narrow-band front-end signals generally. For broader-spectrum front-end signals, however, the operation differs somewhat. In the case of a chirp-radar signal, for instance, the chirp rate of the radar signal is typically at least a significant fraction of the local-oscillator sweep rate, and so the rate of frequency change of the resultant frequency-translator output no longer matches the delay-line relationship of frequency to delay. As a consequence, signals launched into the delay line 24 during different portions of a sweep do not reach its output port at substantially the same time.

It has been proposed in the past to determine the chirp rate of a received chirp signal by observing the frequency spectrum that the chirp signal causes in the output of the dispersive delay line 24. The theory behind this proposal can be understood if one considers a chirp signal whose chirp rate is the negative of the frequency-translator sweep rate. For such a signal, the output of the frequency translator 16 is a constant-frequency signal, as are the outputs of the Gaussian filter 22 and the dispersive delay line 24. Accordingly, the frequency spectrum of the delay-line output that results from such a signal is largely concentrated in a very narrow range. Typically, the particular frequency range changes from sweep to sweep, but the shape of the spectrum remains unchanged, and the chirp signal that causes it can thus be identified readily as one whose chirp rate is the negative of the frequency-translator sweep rate. Furthermore, the power spectrum of such a signal is clearly distinguishable from that caused by a CW signal; the delay-line output power spectrum caused by a CW front-end signal is broader and matches the curve of the Gaussian filter 22.

Although such a scheme appears workable in the case of the specific chirp rate described above, the results are not so satisfactory in many instances. For a signal whose chirp rate is, say, one-quarter that of the local-oscillator sweep rate and lasts throughout the local-oscillator sweep, it can readily be seen that the output of the frequency translator 16 could sweep through the same range of instantaneous frequencies as that which would result from a CW signal, the only difference being that the sweep would be faster so that the output of the delay line 24 would be spread in time. The frequency spectrum would be slightly broader than that resulting from a CW input signal. Howver, the same broad frequency spectrum might also arise from a signal with a lower chirp rate and an amplitude envelope of shorter duration. Accordingly, observation of the frequency spectrum of the compressive-receiver output has drawbacks as a method of distinguishing among different kinds of chirp radars on the basis of their chirp rates.

According to the present invention, chirp radars are distinguished from each other on the basis of their chirp rates by observing the instantaneous frequency of the delay-line output. The discriminator 26 generates a voltage whose value is a function of the instantaneous frequency of the signal that it receives. Compressive-receiver outputs resulting from narrow-band signals last for too short a time to produce a discriminator output if the discriminator 26 is appropriately filtered. Outputs generated in response to chirp signals, on the other hand, are ramps of significant duration, and the chirp rate of the antenna signal can be determined from the slope of the ramp.

It can be shown that the relationship between input chirp rate at the antenna and the output chirp rate at the delay-line output port is given by the following equation:

$$k'' = -k - k'/[(k'/k)^2 + a^4\pi^2 k^2/W^4] \quad (1)$$

where:
  $k$ is the local-oscillator sweep rate;
  $k'$ is the input chirp rate;
  $k''$ is the output chirp rate;
  $W$ is the effective bandwidth of the delay line 24;
  $a = (2/\pi)(\ln A)^{\frac{1}{2}}$; and
  $A$ is the ratio of the weighting-filter attenuation at the ends the delay-line pass band to that in the middle of the pass band.

Figure 2:
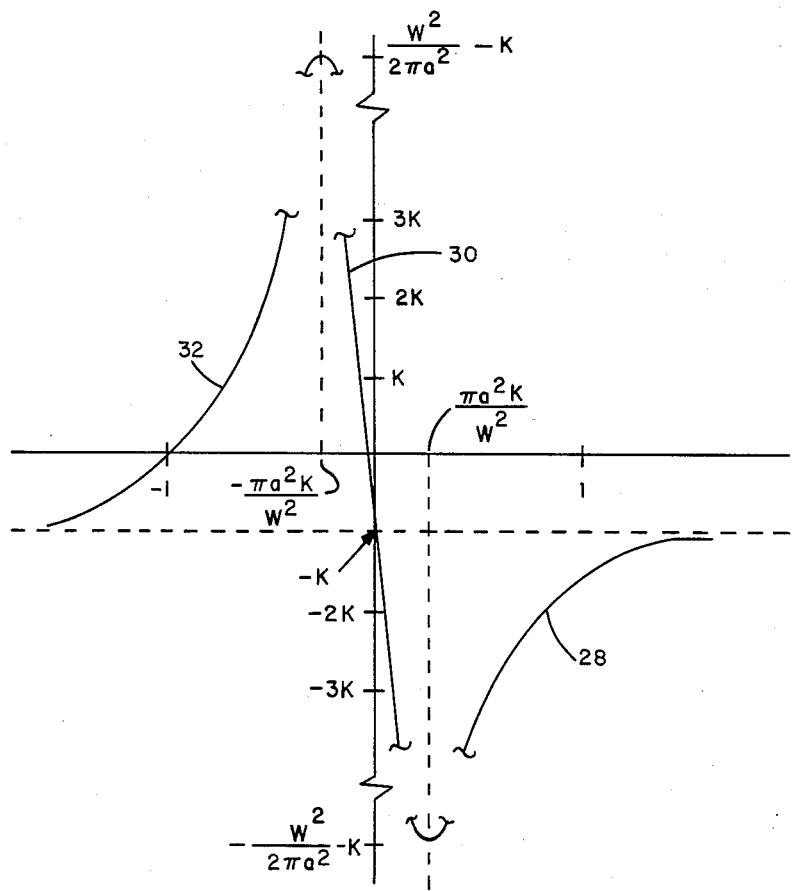
FIG. 2 is a plot of the relationship between the chirp rate of a signal received by the device of FIG. 1 and the chirp rate of its compressive-receiver output.

In FIG. 2, the abscissa represents $k'/k$, the ratio of the front-end output chirp rate to the local-oscillator sweep rate, while the ordinate represents $k''$, the delay-line output chirp rate. The plot of FIG. 2 has three portions 28, 30, and 32. Portion 28 shows that, for positive input chirp rates above a certain minimum, the output chirp rate becomes less negative as the input chirp rate increases. Thus, as input chirp rate increases, the slope of the ramp signal at the output port of the discriminator 26 grows less steep, becoming asymptotic to a value that represents the local-oscillator sweep rate.

For sweep rates that are negative and above a certain minimum magnitude, the relationship is described by portion 32, which indicates that, for relatively small negative input chirp rates, the output chirp rate has a high positive value, so the slope of the discriminator output is relatively steep. As the input chirp rate becomes increasingly negative, the slope becomes less steep until, when the input chirp rate is the negative of the local-oscillator sweep rate, the output chirp rate is zero and the discriminator output is a square wave; that is, its slope is zero during the portion of the sweep in which it responds to the input chirp signal. As the input chirp rate exceeds the negative of the local-oscillator sweep rate, the slope of the discriminator output changes sign to represent a negative output chirp and again becomes asymptotic to a value that represents the local-oscillator sweep rate.

If only portions 28 and 32 of the curve of FIG. 2 are considered, input chirp rate is a single-valued function of output chirp rate; portion 28 approaches the local-oscillator sweep rate from below, while portion 32 approaches it from above. With portion 30 included, a second value is added, so, in theory, there is an ambiguity.

But portion 30 represents the results of input signals whose chirp rates, for delay lines with reasonably high time-bandwidth products, are lower than those of any chirp signals of interest. Such signals result in delay-line outputs of very short duration. The discriminator 26 can be arranged to respond slowly enough that it does not produce significant discriminator outputs in response to such short-duration delay-line outputs. Therefore, input chirp rate is effectively a single-valued function of output chirp rate.

A quantitative example will demonstrate the operation of the invention. Suppose that the system is intended to monitor the 30 MHz-60 MHz frequency band, that the delay line 24 has an effective pass band of 200 MHz to 250 MHz, and that there is a difference of 50 msec between the delay experienced by a 200-MHz signal and that experienced by a 250-MHz signal. Suppose further that the attenuation of the weighting filter 22 at the ends of the delay-line pass band relative to that at its center is 60 db, i.e., that the factor a in equation (1) is approximately 1.67. With such parameters, the frequency translator would ordinarily be arranged to have a sweep rate of 1000 kHz/msec and a sweep range of 80 MHz, from 140 MHz to 220 MHz. The time for a single frequency-translator sweep is thus 80 msec, and a new sweep might start once every 85 msec, which is known as the revisit time. The output sweep time for the delay line—i.e., the difference between the times of occurrence of a delay-line output caused by a 30-MHz antenna signal and that caused by a 60-MHz antenna signal—is 30 msec, with a new sweep occurring once in each 85-msec revisit time.

For such a system, the central portion 30 of FIG. 2 represents only input chirp rates on the order of 10 Hz/msec or less in magnitude. These are negligible chirp rates, and delay-line output pulses resulting from such input chirp pulses are exceedingly short in duration, being virtually indistinguishable from pulses caused by CW inputs. Thus, the discriminator 26 can readily be arranged to respond slowly enough that inputs corresponding to the center portion 30 result in no observable discriminator output.

If such a system receives 50-msec chirp pulses that sweep from 40 MHz to 50 MHz, the input chirp rate is 200 kHz/msec, or one-fifth of the local-oscillator sweep rate. If the system of FIG. 1 receives one such chirp pulse that starts at the same time as a local-oscillator sweep does, the frequency-translator output initially has a frequency of 180 MHz, which is below the frequency range of the weighting filter 22. Therefore, the front-end chirp signal causes no significant delay-line input at the beginning of the local-oscillator sweep. At 16.7 msec into the 80-msec sweep, the mixer output frequency moves into the weighting-filter pass band, and significant mixer output is launched into the delay line 24. As the sweep progresses, the instantaneous frequency of the delay-line input increases at a rate, 1.2 MHz/msec, that is equal to the sum of the input chirp rate and the local-oscillator sweep rate, and the amplitude of the delay-line input varies as a Gaussian function of time, stopping when the front-end output does, i.e., at 50 msec into the 80-msec frequency-translator sweep period. This occurs before the mixer output frequency has reached the 60 db-down frequency of the weighting filter. The duration of delay-line input is thus about 33.3 msec. During this time, the delay-line input frequency sweeps from 200 MHz to 240 MHz.

The 240-MHz portion of the signal takes 40 msec less to travel to the delay-line output port than the 200-MHz portion does. Since the 240-MHz portion arrives at the delay-line input port only 33.3 msec later than the 200-MHz portion does, it arrives at the delay-line input port 6.7 msec earlier, so the output resulting from the chirp signal lasts for approximately 6.7 msec of the 30-msec output sweep period and has a chirp rate of $-6$ MHz/msec. Accordingly, the discriminator output is a ramp that starts at 10 msec into the delay-line output sweep, lasts for 6.7 msec, and has a slope that represents $-6$ MHz/msec. Appropriate circuitry can then be used to measure the slope (e.g., by differentiating the discriminator output and measuring the resulting value) and determine the input chirp rate in accordance with equation (1), which, for input chirp rates on the order of a kilohertz per millisecond or more, is approximately equivalent to:

$$k'' = -k(1+k/k').$$

This implies that $$k' = -k^2/(k''+k). \quad (2)$$

Applying equation (2) for $k'' = -6$ MHz/msec and $k = 1$ MHz/msec yields $k' = 200$ kHz/msec, which is the correct input chirp rate.

Two observations should be made at this point concerning the foregoing example. The first is that the duration of the discriminator output ramp and the times at which it begins and ends depend on the relative timing between the input chirp signal and the local-oscillator sweep. This does not present a significant problem, however, because the duration of the ramp does not affect its slope, which is the feature of most interest. Furthermore, the output ramps caused by different relative timings always begin and end within the same relatively definite segment of the delay-line output sweep. In the example, for instance, the ramp is always confined to the portion of the output sweep between 10 msec and 20 msec, which corresponds to the input-signal frequency range of 40 MHz-50 MHz. In fact, it either begins at 10 msec or ends at 20 msec, so the frequency range of the chirp signal, which can also be of interest, can be inferred from observation of repeated sweeps.

The second observation is that the foregoing example is somewhat simplified in that it does not take into account the effects of any amplitude modulation of the incoming chirp signal, and chirp pulses ordinarily have smoothly changing envelopes rather than square-wave envelopes. The effect of such modulation is to blur the 10-msec and 20-msec boundaries slightly. However, the blurring is not significant, and the frequency range can still be determined with reasonable accuracy.

As a result of the foregoing description, it is apparent that, by employing appropriate circuitry for detecting the slope of the discriminator output and applying the function represented by the plot of FIG. 2, it is possible to identify the frequency range and chirp rate of a received chirp signal in an automatic fashion. Thus, the present invention enables rapid identification of chirp radars and similar frequency-modulated sources.

We claim:

1. An apparatus for detecting frequency-modulated signals whose frequencies are swept at chirp rates, the apparatus comprising:
   A. a frequency translator for generating translated signals by translating the input signals by a frequency difference that is repeatedly swept linearly at a frequency-translator sweep rate;
   B. a dispersive delay line, having an input port connected to receive the translated signals and having an output port at which it presents delayed signals that are delayed versions of the translated signals in which the delay depends on the frequency component being delayed, the difference in delay for a given frequency difference being substantially the negative of the frequency difference divided by the frequency-translator sweep rate; and
   C. a frequency discriminator connected to receive the delayed translated signals and generate a discriminator output proportional to the instantaneous frequency of the delayed translated signal, the time rate of change of a discriminator output component thereby indicating the chirp rate of the frequency-modulated signal component that gave rise to it.

2. An apparatus as recited in claim 1; wherein said frequency translator comprises
   an oscillator for producing an oscillator signal that is repeatedly swept in frequency; and
   a mixer receiving the input signals and the oscillator signal for producing the translated signals;
   and wherein said apparatus further comprises
   a differentiator connected to receive the discriminator output signal and generate a signal indicative of the time rate of change of a discriminator output component; and
   processing means connected to receive the oscillator signal and the time rate of change signal for producing a signal indicative of $-k^2/(k''+k)$ wherein $k''$ is the time rate of change of the discriminator output component and $k$ is the sweep rate of said oscillator,
   whereby a signal is produced by said processing means indicative of the chirp rate of the input signals.

3. An apparatus as recited in claim 1 wherein said dispersive delay line comprises a linear dispersive delay line.

4. An apparatus as recited in claim 1, further comprising:
   a filter operatively connected between said frequency translator and said dispersive delay line.

5. An apparatus as recited in claim 4 wherein said filter comprises a Gaussian weighting filter.

6. A method for detecting frequency-modulated signals whose frequencies are swept at chirp rates, the method comprising:
   A. generating translated signals by translating input signals by a frequency difference that is repeatedly swept linearly at a first sweep rate;
   B. delaying the translated signals to produce delayed signals that are delayed versions of the translated signals in which the delay depends on the frequency component being delayed, the difference in delay for a given frequency difference being substantially the negative of the frequency difference divided by the first sweep rate; and
   C. responsive to the delayed translated signals, generating an output signal proportional to the instantaneous frequency of the translated signal, the time rate of change of an output signal component thereby indicating the chirp rate of the frequency-modulated signal component that gave rise to it.

7. A method as recited in claim 6; wherein said generating step comprises the steps of
   mixing the input signals with a first signal whose frequency is repeatedly swept linearly at the first sweep rate to produce a second signal; and
   filtering the second signal to eliminate lower sideband, limit bandwidth, and minimize any sidelobes of the second signal, to produce the translated signals;
   and wherein said method further comprises the steps of
   differentiating the output signal to produce a signal indicative of the time rate of change of an output signal component; and
   processing the differentiated signal and the first signal to produce a signal indicative of $-k^2/(k''+k)$ wherein $k$ is the first sweep rate and $k''$ is the time rate of change.

8. A method as recited in claim 7 wherein said filtering step comprises the step of:
   filtering the second signal to produce the translated signals each with Gaussian amplitude envelopes.

9. Apparatus for indicating frequency range and any chirp rate of a signal, comprising:
   first means, adapted to receive a first signal being measured, for generating in response to the first signal, a second signal whose time of occurrence, relative to a repetitive preset time-frame, depends on the frequency of the first signal; and
   second means, operatively receiving the second signal, for generating a third signal representative of the instantaneous frequency of the second signal, whereby a third signal is produced whose time of occurrence, relative to the repetitive preset time-frame, indicates the frequency range of the first signal, and whose rate of change within the time-frame is indicative of any chirp rate of the first signal.

10. Apparatus as recited in claim 9 wherein said second means comprises means for generating a third signal of instantaneous amplitude proportional to the instantaneous frequency of the second signal received by said second means, and wherein said apparatus further comprises a differentiator, operatively receiving the third signal, for generating a fourth signal indicative of the rate of change of the third signal within the time frame; and processing means, operatively receiving the fourth signal, for generating a fifth signal representative of $-k^2/(k''+k)$ wherein k is the repetition rate of the repetitive preset time-frame and k'' is the rate of change of the third signal within the time-frame.

11. Apparatus as recited in claim 9 wherein said first means comprises:

third means for translating the frequency of the first signal by a repetitively varying amount; and a dispersive delay line receiving the translated first signal, for producing the second signal.

12. Apparatus as recited in claim 11 wherein said third means comprises:

an oscillator for producing an oscillator signal that is repeatedly swept in frequency; and a mixer receiving the oscillator signal for mixing the oscillator signal with the first signal to produce the translated first signal.

13. Apparatus as recited in claim 11 wherein said dispersive delay line comprises a linear dispersive delay line.

14. Apparatus as recited in claim 11 wherein said first means further comprises:

filter means, operatively connected between said third means and said dispersive delay line, for band-limiting the signal produced by said third means.

15. Apparatus as recited in claim 14, wherein said filter means comprises a Gaussian weighting filter.

16. Method of indicating frequency range and any chirp rate of a signal, the method comprising the steps of:

responsive to a first signal being measured, generating a second signal whose time of occurrence, relative to a repetitive preset time-frame, depends on the frequency of the first signal; and responsive to the second signal, generating a third signal representative of the instantaneous frequency of the second signal, whereby a third signal is produced whose time of occurrence, relative to the repetitive preset time-frame, indicates the frequency range of the first signal, and whose rate of change within the time-frame is indicative of any chirp rate of the first signal.

17. A method as recited in claim 16 wherein said step of generating a third signal comprises generating the third signal of instantaneous amplitude proportional to the instantaneous frequency of the second signal.

18. A method as recited in claim 16: wherein said step of generating a second signal comprises mixing the first signal with a fourth signal of repetitively swept frequency to produce a fifth signal;

filtering the fifth signal to eliminate lower sideband, limit bandwidth, and minimize any sidelobes of the fifth signal; and variably delaying the filtered fifth signal as a function of frequency content of the filtered fifth signal;

and wherein said method further comprises the steps of differentiating the third signal to produce a sixth signal; and processing the sixth signal to produce a signal indicative of $-k^2/(k''+k)$ wherein k is the repetition rate of the third signal and k'' is the rate of change of the third signal.

19. A method as recited in claim 18 wherein said filtering step comprises the step of:

filtering the fifth signal to produce the filtered fifth signal with an amplitude envelope that is Gaussian.

20. A method as recited in claim 18 wherein said variably delaying step comprises the step of:

delaying the filtered fifth signal such that the difference in delay of each frequency component of the filtered fifth signal for a given frequency difference is substantially the negative of the frequency difference divided by repetition rate of the repetitive preset time-frame.

21. Apparatus for detecting frequency-modulated signals whose frequencies are swept at chirp rates, the apparatus comprising:

a bandpass filter receiving a first signal for producing a second signal;

first means, receiving the second signal, for translating the frequency of the first signal by a repetitively varying amount to produce a third signal;

a weighting filter receiving the third signal for producing a fourth signal;

a dispersive delay line receiving the fourth signal for producing a fifth signal;

a frequency discriminator receiving the fifth signal for producing a sixth signal representing the instantaneous frequency of the fifth signal, wherein the rate of change of the sixth signal indicates any chirp rate of the first signal;

a differentiator receiving the sixth signal for producing a seventh signal representing the rate of change of the sixth signal; and processing means receiving the seventh signal for producing an eighth signal representative of $-k^2/(k''+k)$ wherein k is the repetition rate of said first means and k'' is the rate of change of the sixth signal.

22. An apparatus as recited in claim 1 wherein said frequency translator comprises:

an oscillator for producing an oscillator signal that is repeatedly swept in frequency; and a mixer receiving the input signals and the oscillator signal for producing the translated signals.

23. An apparatus as recited in claim 1, further comprising:

a differentiator connected to receive the discriminator output signal and generate a signal indicative of the time rate of change of a discriminator output component; and processing means connected to receive the oscillator signal and the time rate of change signal for producing a signal indicative of $-k^2/(k''+k)$ wherein k'' is the time rate of change of the discriminator output component and k is the sweep rate of said oscillator, whereby a signal is produced by said processing means indicative of the chirp rate of the input signals.

24. A method as recited in claim 6 wherein said generating step comprises the steps of:

mixing the input signals with a first signal whose frequency is repeatedly swept linearly at the first sweep rate to produce a second signal; and filtering the second signal to eliminate lower sideband, limit bandwidth, and minimize any sidelobes of the second signal, to produce the translated signals.

25. A method as recited in claim 6, further comprising the steps of:
    differentiating the output signal to produce a signal indicative of the time rate of change of an output signal component; and
    processing the differentiated signal and the first signal to produce a signal indicative of $-k^2/(k''+k)$ wherein k is the first sweep rate and k'' is the time rate of change.

26. Apparatus as recited in claim 9 wherein said second means comprises means for generating a third signal of instantaneous amplitude proportional to the instantaneous frequency of the second signal received by said second means.

27. Apparatus as recited in claim 9, further comprising:
    a differentiator, operatively receiving the third signal, for generating a fourth signal indicative of the rate of change of the third signal within the time frame; and
    processing means, operatively receiving the fourth signal, for generating a fifth signal representative of $-k^2/(k''+k)$ wherein k is the repetition rate of the repetitive preset time-frame an k'' is the rate of change of the third signal within the time-frame.

28. A method as recited in claim 16 wherein said step of generating a second signal comprises:
    mixing the first signal with a fourth signal of repetitively swept frequency to produce a fifth signal;
    filtering the fifth signal to eliminate lower sideband, limit bandwidth, and minimize any sidelobes of the fifth signal; and
    variably delaying the filtered fifth signal as a function of frequency content of the filtered fifth signal.

29. A method as recited in claim 16, further comprising the steps of:
    differentiating the third signal to produce a sixth signal; and
    processing the sixth signal to produce a signal indicative of $-k^2/(k''+k)$ wherein k is the repetition rate of the third signal and k'' is the rate of change of the third signal.

30. Apparatus as recited in claim 21 wherein said first means comprises:
    an oscillator for producing an oscillator signal that is repeatedly swept in frequency; and
    a mixer receiving the second signal and the oscillator signal for producing the third signal.

31. Apparatus as recited in claim 21 wherein said dispersive delay line comprises a linear dispersive delay line.

32. Apparatus as recited in claim 21 wherein said weighting filter comprises a Gaussian weighting filter.

* * * * *